United States Patent [19]

Uda et al.

[11] Patent Number: 4,889,665

[45] Date of Patent: Dec. 26, 1989

[54] PROCESS FOR PRODUCING ULTRAFINE PARTICLES OF CERAMICS

[75] Inventors: Masahiro Uda, Tokyo; Satoru Ohno, Kiyose; Hideo Okuyama, Kawasaki, all of Japan

[73] Assignee: National Research Institute for Metals, Tokyo, Japan

[21] Appl. No.: 882,536

[22] Filed: Jul. 7, 1986

Related U.S. Application Data

[62] Division of Ser. No. 616,686, Jun. 4, 1984, Pat. No. 4,642,207.

[30] Foreign Application Priority Data

Jun. 4, 1983 [JP] Japan ................................. 58-98786

[51] Int. Cl.$^4$ .............................................. B29B 9/00
[52] U.S. Cl. ....................................... 264/10; 264/22; 264/82
[58] Field of Search ....................... 264/10, 82, 81, 80, 264/22

[56] References Cited

U.S. PATENT DOCUMENTS

| | | | |
|---|---|---|---|
| 3,917,782 | 11/1975 | Holcombe et al. | 264/81 |
| 4,009,233 | 2/1977 | Cloran et al. | 264/82 |
| 4,038,092 | 7/1977 | Baumgartner et al. | 264/82 |
| 4,069,060 | 1/1978 | Hayashi et al. | 264/82 |
| 4,218,410 | 8/1980 | Stephan et al. | 264/10 |
| 4,374,075 | 2/1983 | Yolton et al. | 264/10 |
| 4,376,740 | 3/1983 | Uda et al. | 264/10 |
| 4,481,134 | 11/1984 | Uda et al. | 425/6 X |
| 4,482,375 | 11/1984 | Sastry et al. | 264/10 |
| 4,500,483 | 2/1985 | Veltri et al. | 264/81 |

FOREIGN PATENT DOCUMENTS 654294 12/1962 Canada ................................. 264/81

OTHER PUBLICATIONS

Metastable Immiscibility and Microstructural Development During Sintering of a SiO$_2$–Al$_2$O$_3$ Plasma Prepared Powder, *Journal of Materials Science*, 1980, 15, pp. 25–30.
The Formation of Silicon Carbide in the Electric Arc, W. E. Kuhn, *Ultrafine Particles*, edited by Kuhn, Lamprey & Sheer, John Wiley & Sons, Inc. 1963.
Thermal Plasma Synthesis of Transition Metal Nitrides and Alloys, P. Ronsheim, *Plasma Chemistry and Plasma Processing*, vol. 2, pp. 135–147.
Preparation of Ultrafine Powder of SiC by a Modified Gas–Evaporation Method, Y. Ando et al., *Japanese J. of Appl. Phys.*, vol. 19, No. 11 (1980), pp. L693–L694.
Preparation of Ultrafine Particles of Refractory Metal Carbides by a Gas–Evaporation Method, Y. Ando & R. Uyeda, *Journal of Crystal Growth*, 52 (1981), 178–181.
Preparation of Ultrafine SiC Particles by Gas Evaporation, Y. Ando & R. Uyeda *Journal of the American Ceramic Society*, vol. 64, No. 1, Jan., 1981.
Ultrafine Powders of TiN and AlN Produced by a Reactive Gas Evaporation Technique With Electron Beam Heating, S. Iwama, K. Hayakawa and T. Arizumi, *Journal of Crystal Growth*, 56 (1982), pp. 265–269.
Thorpe, M. L., Research/Development, Jan. 1960, pp. 5–15.
The Plasma Jet and Its Uses.
Hurley et al., *Ceramic Bulletin*, vol. 58, No. 5 (1979), pp. 509–511.
Structure and Thermal Diffusivity of Plasma–Sprayed, Al$_2$O$_3$.
Durmann et al., *Ceramic Bulletin*, vol. 48, No. 2 (1969), pp. 221–224.

*Primary Examiner*—Jan H. Silbaugh
*Assistant Examiner*—Mary Lynn Fertig
*Attorney, Agent, or Firm*—Wenderoth, Lind & Ponack

[57] ABSTRACT

A process for producing ultrafine particles of a ceramic, which comprises heating a ceramic having substantially the same components as the final ultrafine ceramic particles, a metal constituting the metal component of the final ultrafine ceramic particles, a mixture of said ceramic with said metal or carbon, or a mixture of said metal with carbon by an arc plasma or a high frequency induction plasma generated in hydrogen, nitrogen, oxygen, a gaseous mixture of hydrogen and nitrogen, or a gaseous mixture of nitrogen and oxygen.

1 Claim, 5 Drawing Sheets ature (more than about 10,000 K.) generated by the arc
PROCESS FOR PRODUCING ULTRAFINE PARTICLES OF CERAMICS This application is a divisional application of application Ser. No. 616,686, filed June 4, 1984 (now U.S. Pat. No. 4,642,207).

This invention relates to a process for producing ultrafine particles of a ceramic, particularly those having a size of less than 1 micrometer.

The "ceramic", as used herein, denotes an oxide, nitride or carbide of a metal or a mixture thereof.

Ceramics generally have excellent heat resistance, corrosion resistance and abrasion resistance, and exhibit unique electrical or optical properties. Because of these properties, they have had extensive use as heat-resistant, corrosion-resistant or abrasion-resistant materials or as optical or electronic materials.

Ceramic materials generally pose difficulties in sintering. When these materials are converted to ultrafine particles, however, this defect is removed or can be ignored. Hence, the ceramics in the form of ultrafine particles can exhibit their function in a wider range of applications.

For the production of ultrafine particles of ceramics, there has previously been known a vapor-phase reaction method which comprises oxidizing, nitriding or carbiding a vapor of a metal chloride or a metal hydride. The vapor-phase reaction method, however, has some defects. Among these are:

(1) The kind of ceramics that can be produced is very much limited, and the manufacturing ability is low.

(2) The chloride, ammonia, carbon, etc. which are by-products of the reaction contaminate the ceramics, and it is difficult to prevent this contamination. Furthermore, much care is required in preventing the corrosion of the manufacturing equipment and pollution.

(3) A mixture of different kinds of ceramics in ultrafine particles (for example, a mixture of an oxide ceramic and a carbide ceramic in ultrafine particles) cannot be produced.

It is an object of this invention to remove these defects and to provide a process for producing ultrafine particles of a ceramic or ultrafine particles of a mixture of different kinds of ceramics highly efficiently by a simple device without causing pollution.

According to this invention, there is provided a process for producing ultrafine particles of a ceramic, which comprises heating a ceramic having substantially the same components as the final ultrafine ceramic particles or a mixture of said ceramic with a metal constituting the metal component of the final ultrafine ceramic particles or carbon by an arc plasma or a high frequency induction plasma generated in hydrogen, nitrogen, oxygen, a gaseous mixture of hydrogen and nitrogen, or a gaseous mixture of nitrogen and oxygen.

This invention also provides a process for producing ultrafine particles of a ceramic, which comprises heating a metal constituting the metal component of the final ultrafine ceramic particles or a mixture of said metal with carbon by an arc plasma or a high frequency induction plasma generated in nitrogen, hydrogen, oxygen, a gaseous mixture of nitrogen and hydrogen, or a gaseous mixture of nitrogen and oxygen.

According to one embodiment of this invention, an inert gas selected from argon, helium and neon may be added to the gas or the gaseous mixture.

The mechanism of formation of the ultrafine particles in the process of this invention is not clear, but may be roughly theorized as follows: At a high temperature (more than about 10,000 K.) generated by the arc plasma or the high frequency induction plasma, most of a molecular gas consisting of two atoms, such as hydrogen, nitrogen or oxygen, dissociates and exists in the state of atoms or ions. These atoms or ions are in the activated state with a much higher energy than ordinary molecular gases. Accordingly, when these activated gases are contacted with a ceramic or metal, a very active reaction occurs, and in the course of this reaction, the corresponding ultrafine ceramic particles will be formed.

Oxide-type ceramics produced conveniently by the process of this invention are oxides of Ca, Mg, Zn, Al, Si, Ti, Zr, Sn, Pb, V, Nb, Cr, Mo, W and Cu. The oxides of Ca, Mg, Zr, Cr, Mo and W are particularly preferred.

Nitride-type ceramics produced conveniently by the process of this invention are nitrides of B, Al, Si, Ti, Zr, Hf, V, Nb, Ta, Cr, Mo and W. The nitrides of Al, Ti, Zr and Hf are particularly preferred.

Carbide-type ceramics produced conveniently by the process of this invention are carbides of B, Si, Ti, Zr, Hf, V, Nb, Ta, Cr, Mo and W. The carbides of Si, Ti, Hf and W are particularly preferred.

In the present invention, a ceramic having substantially the same components as the final ultrafine ceramic particles, a metal which is a component of the final ultrafine ceramic particles, or a mixture of such a ceramic and metal are used as a starting material. When it is desired to produce ultrafine particles of a carbide ceramic, carbon may further be added to the aforesaid starting material.

When ultrafine particles of an oxide ceramic are to be produced by using an oxide ceramic or a mixture of an oxide ceramic and a metal as a starting material, hydrogen, nitrogen, oxygen or a mixture of oxygen and nitrogen may be used as an atmosphere in which such a starting material is heated by an arc plasma or a high frequency induction plasma. In the production of ultrafine particles of an oxide ceramic using a metal as a starting material, oxygen or a mixture of nitrogen and oxygen may be used as an atmosphere in which the starting material is heated by an arc plasma or a high frequency induction plasma. In either case, the above gas or gaseous mixture may be used after it is diluted with an inert gas such as argon, helium, or neon. The particle size of the ultrafine particles and the rate of formation of such ultrafine particles can be controlled by changing the degree of dilution. Furthermore, steam may be added to the hydrogen atmosphere in order to inhibit reduction of the ultrafine particles of the oxide ceramics obtained.

When ultrafine particles of a nitride ceramic are to be produced by using a nitride ceramic or a mixture of a nitride ceramic and a metal as a starting material, hydrogen, nitrogen, or a mixture of hydrogen and nitrogen may be used as an atmosphere in which the starting material is heated by an arc plasma or a high frequency induction plasma. The use of hydrogen prevents the formation of the corresponding oxide and serves to retain the purity of the nitride ceramic. Furthermore, it increases the producing ability. In the production of ultrafine particles of a nitride ceramic using metals as a starting materials, nitrogen or a mixture of nitrogen and hydrogen is used as an atomsphere in which the starting material is heated by an arc plasma or a high frequency induction plasma. The use of nitrogen alone is preferred. In either case, the above gas or gaseous mixture may be diluted with an inert gas such as argon, helium or neon.

In the production of ultrafine particles of a carbide ceramic using a carbide ceramic or a mixture of an oxide ceramic and a metal or carbon as a starting material, hydrogen, nitrogen or a gaseous mixture of hydrogen and nitrogen is used as the atmosphere in which the starting material is heated by an arc plasma or a high frequency induction plasma. In the production of ultrafine particles of a carbide ceramic using a carbide ceramic as a starting material, hydrogen gas alone is preferred as the atmosphere. An inert gas may be added to the atmosphere in order to control the particle size of the ultrafine particles or improve the operability. Furthermore, a gaseous, carbon-containing compound such as methane or ethane may be added to the atmosphere.

The pressure of the atmosphere in which the process of this invention is carried out may be one under which an arc plasma or a high frequency induction plasma can be generated stably and maintained. Usually, it is in the range of 760 torr (1 atmosphere) to about 50 torr.

An ordinary arc melting furnace, plasma melting furnace and high-frequency induction plasma device may be used in carrying out the process of the invention. A specific example of an especially useful device for the control of the particle size of the ultrafine ceramic particles or improvement of the capturing efficiency will be described with reference to the accompanying drawings in which.

Figure 9:
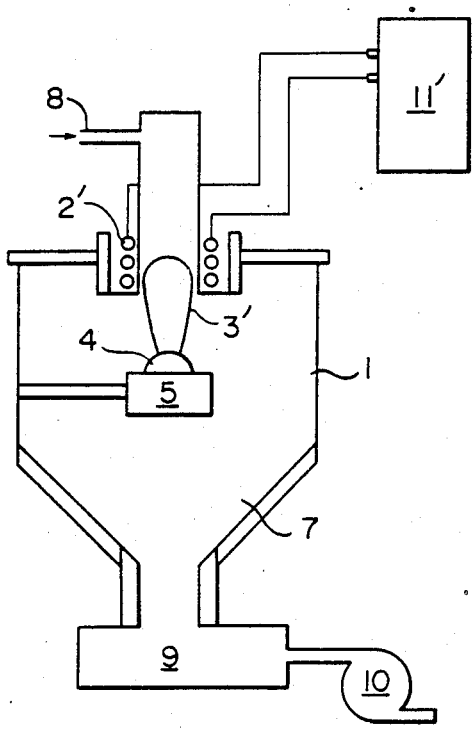

FIGS. 3 to 8 are electron microphotographs of ultrafine particles of ceramics obtained by the process of this invention, which respectively show ultrafine particles of a silicon carbide ceramic, an aluminum oxide ceramic, a zirconium oxide ceramic, a magnesium oxide ceramic, a tungsten oxide ceramic, and a titanium nitride ceramic; and FIG. 9 is a schematic view of a high frequency induction plasma device.

Figure 1:
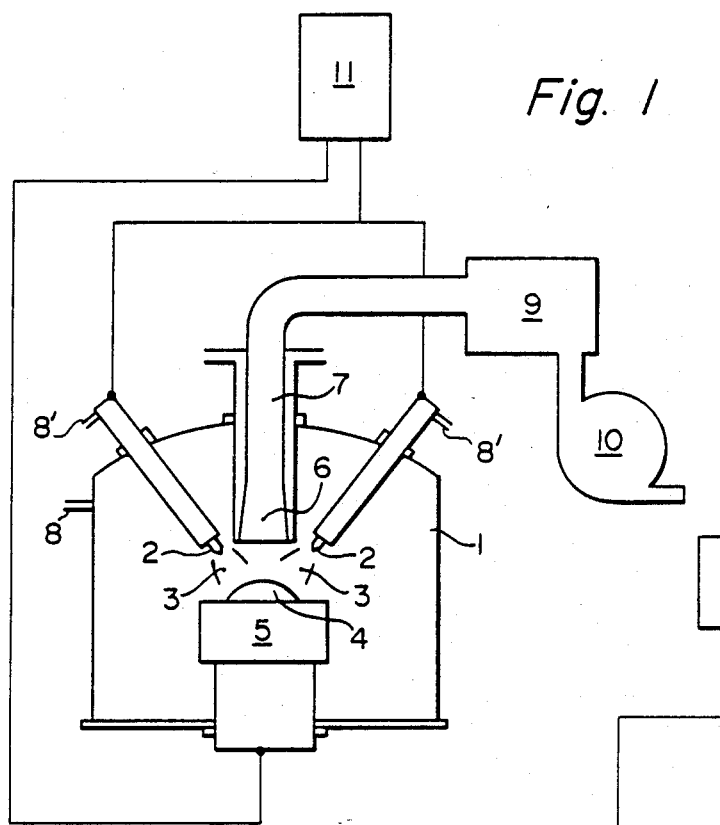
FIG. 1 is a schematic view of an arc melting device using a dc power supply.

Referring to FIG. 1, one or a plurality of discharging electrodes 2 are provided at the upper portion of a closed container 1. A voltage is applied across the discharging electrodes 2 and a starting material 4 placed on a water-cooled copper hearth 5 by a dc power supply 11 to generate an arc 3. A given atmospheric gas is introduced from a gas introducing inlet 8 or 8', and the inside of the closed container 1 is maintained at a predetermined pressure. By the generation of the arc, hydrogen, nitrogen or oxygen in the introduced atmospheric gas is activated, or the starting material is heated. The activated hydrogen, nitrogen or oxygen reacts with the heated starting material. When the starting material is a mixture of a ceramic and a metal or carbon or a mixture of a metal and carbon, the reaction of the ceramic with the metal or carbon occurs simultaneously. In the process of such reactions, ultrafine particles of the ceramic are generated. The generated ultrafine particles of the ceramic are sucked from a suction port 6 together with the atmospheric gas introduced and carried to a cooler 7 where they are rapidly cooled. They are then transferred to a collector 9 and collected. The reference numeral 10 represents a suction pump.

When a ceramic having low electric conductivity, such as an oxide ceramic, is used as the starting material, it may be effectively heated by a plurality of electrodes. Heating by an ac arc using an ac current is also effective.

Figure 2:
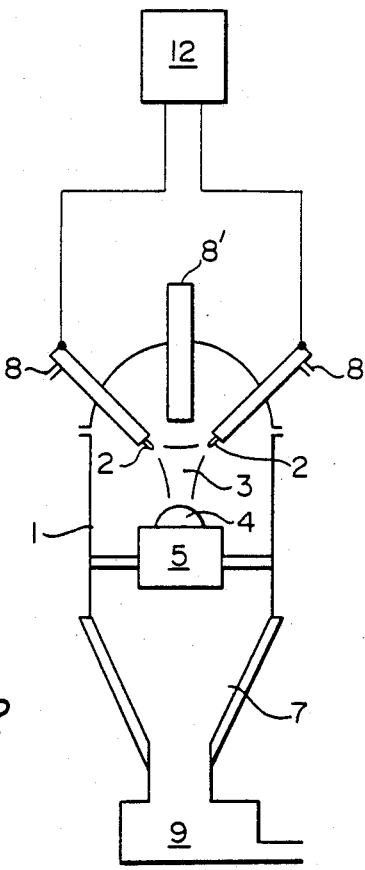
FIG. 2 is a schematic view of an arc melting device which empoloys an ac power supply.
Figure 3:
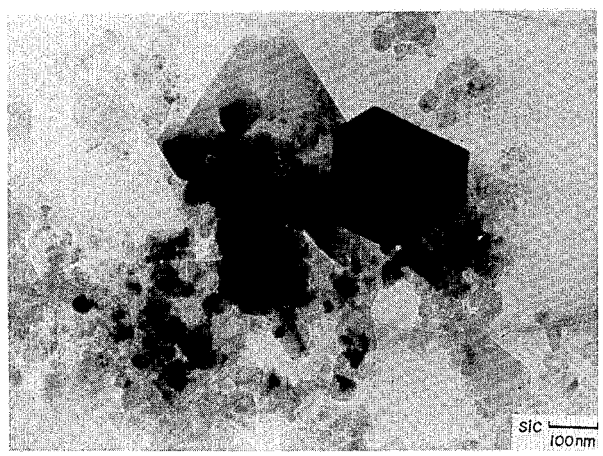
Figure 4:
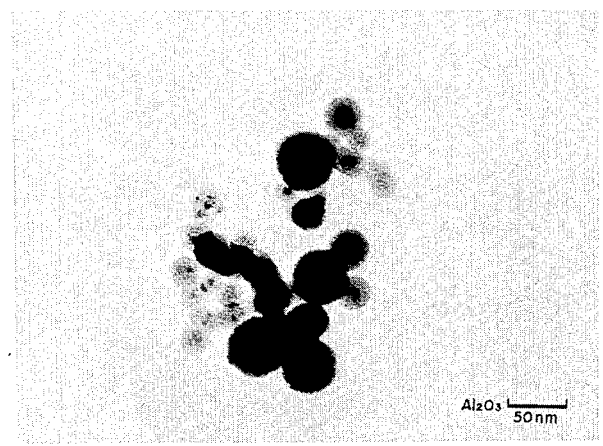
Figure 5:
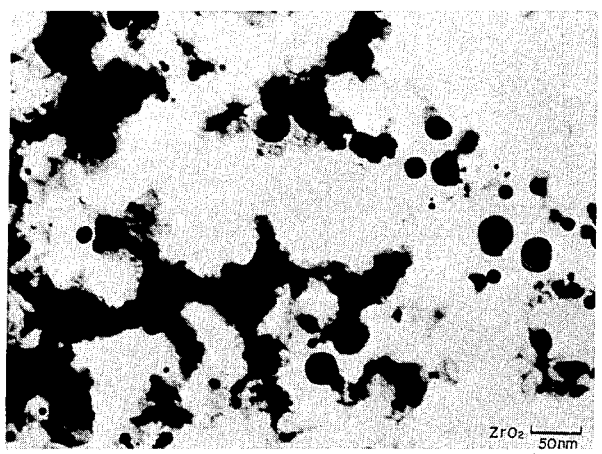
Figure 6:
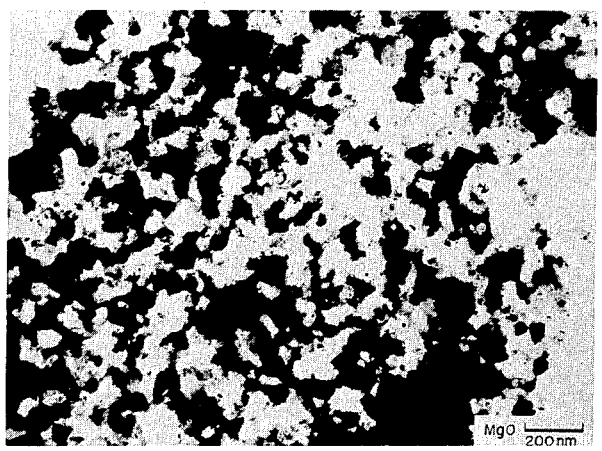
Figure 7:
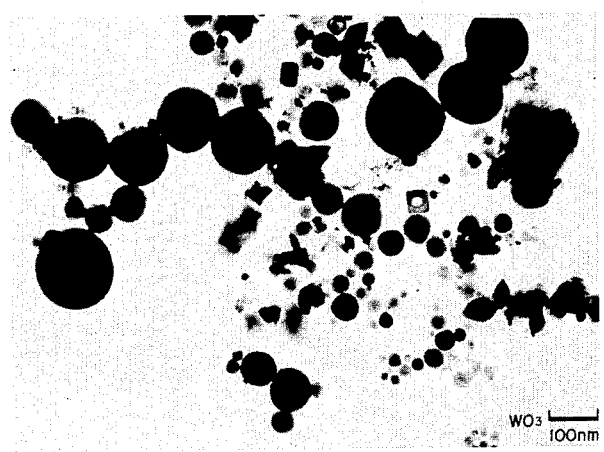
Figure 8:
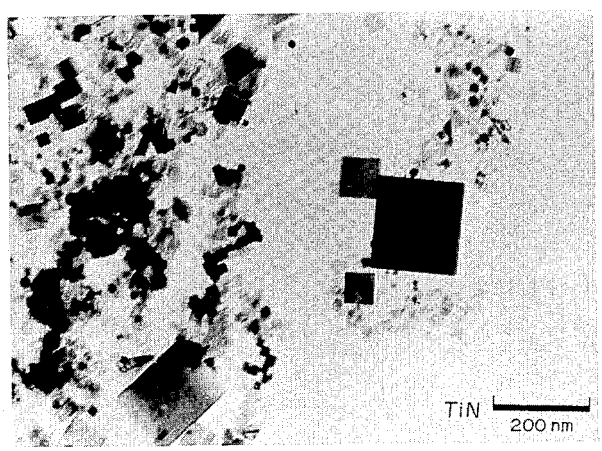

With reference to FIG. 2, a voltage is applied across a pair of discharging electrodes 2 provided in the upper portion of a vertical cylindrical closed container 1 by an ac power supply 12 to generate an arc 3 and thus heat a starting material 4. Thus, ultrafine ceramic particles generated in the same way as in the case of using a dc power supply are collected by a collector via a cooler 7.

FIG. 9 shows another example of a device for use in the practice of this invention. The reference numeral 2' represents a high frequency coil; 3', a high frequency induction plasma; and 11', a high-frequency power supply for generating a frequency of about 3–15 MHz. A starting material 4 is heated by the plasma 3', and the generated ultrafine ceramic particles are collected by a collector 9 via a cooler 7.

The following Examples illustrate the present invention more specifically.

EXAMPLE 1

Silicon carbide as a starting material was heated by a dc arc plasma (current 140 A; voltage 30–40 V) generated in an atmosphere of a mixture of 30% $H_2$ and 70% argon kept at a pressure of 760 torr in the same apparatus as shown in FIG. 1 to obtain ultrafine particles of silicon carbide. The starting silicon carbide was a lumpy product having a purity of more than 99%.

X-ray diffraction led to the determination that these ultrafine particles are those of silicon carbide. The ultrafine particles had a particle diameter of 0.02 to 0.5 micrometer, and were spherical or polygonal as shown in the electron microphotograph of FIG. 3.

EXAMPLE 2

Aluminum oxide as a starting material was heated by an ac arc plasma (current 100 A; voltage 30–50 V) generated in an atomsphere of a mixture of 50% $H_2$ and 50% argon kept at a pressure of 760 torr in the same device as shown in FIG. 2 to obtain ultrafine particles of aluminum oxide. The starting aluminum oxide was a lumpy product having a purity of more than 99.9%.

X-ray diffraction led to the determination that these ultrafine particles are those of aluminum oxide. The ultrafine particles had a particle diameter of 0.01 to 0.1 micrometer, and were spherical as shown in the electron microphotograph of FIG. 4.

EXAMPLE 3

Zirconium oxide as a starting material was heated by an ac arc plasma (current 180 A; voltage 30–50 V) generated in an atomsphere of a mixture of 50% $H_2$ and 50% argon kept at a pressure of 760 torr to obtain ultrafine particles of zirconium oxide. The starting zirconium oxide was a lumpy product having a purity of at least 99.9%.

X-ray diffraction led to the determination that these ultrafine particles are those of zirconium oxide. The ultrafine particles had a particle diameter of 0.02 to 0.2 micrometer, and were mainly spherical as shown in the electron microphotograph of FIG. 5.

EXAMPLE 4

Magnesium oxide as a starting material was heated by an arc plasma (current 180 A; voltage 30–50 V) generated in an atmosphere of a mixture of 50% H₂ and 50% argon kept at a pressure of 760 torr to obtain ultrafine particles of magnesium oxide. The starting magnesium oxide was a lumpy product having a purity of more than 99.9%.

X-ray diffraction led to the determination that the resulting ultrafine particles are those of magnesium oxide. The ultrafine particles had a particle diameter of 0.02 to 0.5 micrometer, and were polygonal and spherical as shown by the electron microphotograph of FIG. 6.

EXAMPLE 5

A mixture of silicon oxide and metallic aluminum in a weight ratio of 3:2 was heated by a dc arc plasma (current 200 A; voltage 20-30 V) in an atmosphere of 100% N₂ kept at a pressure of 760 torr to obtain ultrafine particles of a mixture of silicon oxide and aluminum nitride. The starting silicon oxide was a powder having a purity of more than 99.9%, and the starting metallic aluminum was a powder (100 mesh) having a purity of more than 99.9%. These materials had been mixed and pressed under a pressure of 10 tons/cm² to form pellets before they were heated.

X-ray diffraction led to the determination that the resulting ultrafine particles were those of a mixture of silicon oxide and aluminum nitride. In the resulting ultrafine particles, silicon oxide was in the form of spherical particles having a particle diameter of 0.02 to 0.5 micrometer, and aluminum nitride was in the form of needle-like particles having a length of about 0.5 micrometer and a width of about 0.03 micrometer.

EXAMPLE 6

A mixture of silicon oxide and carbon in a weight ratio of 1:2 was heated by a dc arc plasma (current 200 A; voltage 20-30 V) in an atmosphere of a mixture of 50% H₂ and 50% argon kept at a pressure of 760 torr to obtain ultrafine particles of a mixture of silicon oxide and silicon carbide. The starting silicon oxide was the same as that used in Example 5, and the starting carbon was a graphite powder. These materials had been mixed and pressed under 10 tons/cm² to form pelelts before they were heated.

X-ray diffraction led to the determination that the ultrafine particles are those of a mixture of silicon oxide and silicon carbide. In the resulting ultrafine particles, silicon oxide was in the form of spherical particles having a particle diameter of 0.02 to 0.5 micrometer, and silicon carbide was in the form of polygonal or spherical particles having a particle diameter of 0.02 to 0.5 micrometer.

EXAMPLE 7

Metallic titanium (purity more than 99%; lump) as a starting material was heated by a dc arc plasma (current 140 A; voltage 30-40 V) in an atmosphere of 100% N₂ at a pressure of 760 torr using the same device as shown in FIG. 1 to obtain ultrafine particles of titanium nitride.

X-ray diffraction led to the deetermination that the resulting ultrafine particles are those of titanium nitride. The ultrafine particles had a particle diameter of 0.02 to 0.5 micrometer, and were in the form of cubic crystals having a NaCl type crystal form as shown by the electron microphotograph of FIG. 8.

EXAMPLE 8

Metallic tungsten (purity more than 99%, a sintered body of powder) as a starting material was heated by a dc arc plasma (current 140 A; voltage 30-40 V) in an atmosphere of 100% O₂ at a pressure of 760 torr by using the same device as shown in FIG. 1.

X-ray diffraction led to the determination that the resulting ultrafine particles are those of tungsten oxide. The ultrafine particles had a particle diameter of 0.20 to 0.3 micrometer and were spherical or polygonal as shown by the electron microphotograph of FIG. 7.

As shown hereinabove, the process of this invention brings about excellent advantages. For example, it easily gives ultrafine particles of various ceramics, or ultrafine particles of a mixture of dissimilar ceramics without the formation of the corresponding chloride, ammonia, etc. which occur in the prior art. Accordingly, there is no need to take measures against corrosion inhibition of the manufacturing equipment. Furthermore, the process does not cause pollution, and can give the aforesaid products with a high efficiency.

What is claimed is:

1. A process for producing ultrafine particles of ceramics selected from the group consisting of oxides of Ca, Mg, Zr, Cr, Mo and W and carbides of Si, Ti, Hf and W, which comprises
   (1) contacting a mass of ceramics selected from the group consisting of oxides of Ca, Mg, Zr, Cr, Mo and W and carbides of Si, Ti, Hf and W with a gas activated by an arc plasma which is generated by application of a voltage across a pair of discharging electrodes at a pressure of about 50 to 760 torr to generate ultrafine particles of said ceramic, wherein said gas is selected from the group consisting of nitrogen, oxygen, and a gaseous mixture of nitrogen and oxygen, and
   (2) cooling and collecting said particles.

* * * * *